(12) United States Patent
Harris

(10) Patent No.: US 8,588,605 B2
(45) Date of Patent: Nov. 19, 2013

(54) DUAL POLARIZING HOOD

(75) Inventor: Michael D. Harris, Scottsdale, AZ (US)

(73) Assignee: GlobalMedia Group, LLC, Scottsdale, AZ (US)

( * ) Notice: Subject to any disclaimer, the term of this patent is extended or adjusted under 35 U.S.C. 154(b) by 58 days.

(21) Appl. No.: 13/246,590

(22) Filed: Sep. 27, 2011

(65) Prior Publication Data

US 2013/0071103 A1 Mar. 21, 2013

Related U.S. Application Data

(60) Provisional application No. 61/537,507, filed on Sep. 21, 2011.

(51) Int. Cl.
*G03B 11/00* (2006.01)

(52) U.S. Cl.
USPC ........................................... 396/544

(58) Field of Classification Search
USPC ....................... 359/487.05, 487.01
See application file for complete search history.

(56) References Cited

U.S. PATENT DOCUMENTS

| | | | |
|---|---|---|---|
| 2,194,523 A | 3/1940 | Hans et al. | |
| 3,572,905 A | 3/1971 | Schlapp | |
| 3,759,153 A | 9/1973 | Aimo et al. | |
| 5,198,875 A | 3/1993 | Bazin et al. | |
| 6,010,450 A | 1/2000 | Perkins | |
| 6,032,071 A | 2/2000 | Binder | |
| 6,104,887 A | 8/2000 | Hamasaki et al. | |
| 6,269,227 B1 | 7/2001 | Hamasaki et al. | |
| 6,389,238 B1 * | 5/2002 | Suzuki | 396/534 |
| 6,587,711 B1 | 7/2003 | Alfano et al. | |
| 7,004,599 B2 * | 2/2006 | Mullani | 362/139 |
| 7,167,243 B2 * | 1/2007 | Mullani | 356/369 |
| 7,167,244 B2 * | 1/2007 | Mullani | 356/369 |
| 2009/0189972 A1 | 7/2009 | Harris | |

* cited by examiner

*Primary Examiner* — Clayton E LaBalle
*Assistant Examiner* — Dennis Hancock
(74) *Attorney, Agent, or Firm* — Snell & Wilmer L.L.P.

(57) ABSTRACT

A polarizing hood including a first polarized filter with the center of the filter removed. Placed forward and in front of the first polarized filter is a second linear polarized filter substantially the size of the hole in the first polarized filter and is held in place by a clear lens. The polarization may be adjusted. In response to light collocated with an objective lens shined through the first polarizing filter, the light become polarized. The reflected polarized light returns through the second polarized filter, and full polarization is accomplished with respect to the viewing camera.

17 Claims, 14 Drawing Sheets

(Section A-A)

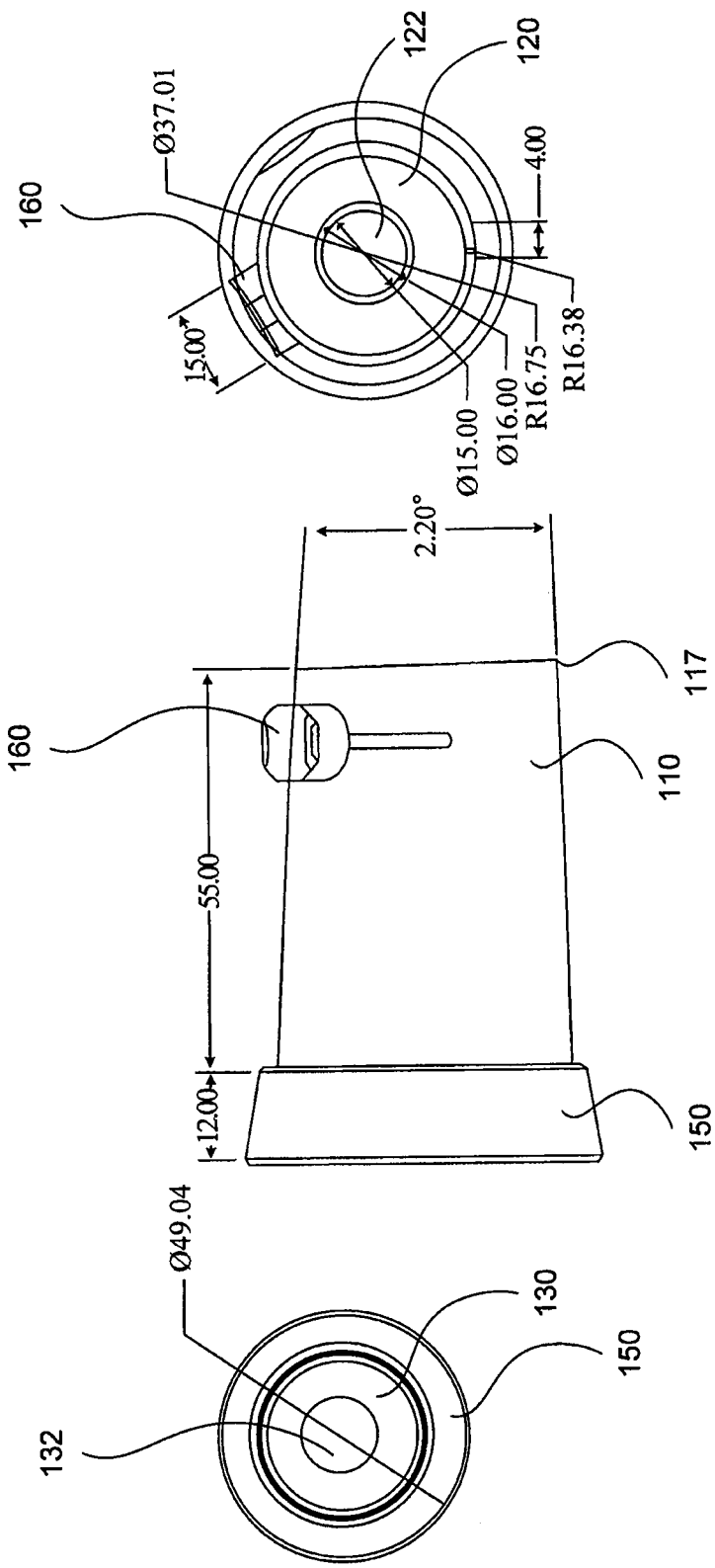

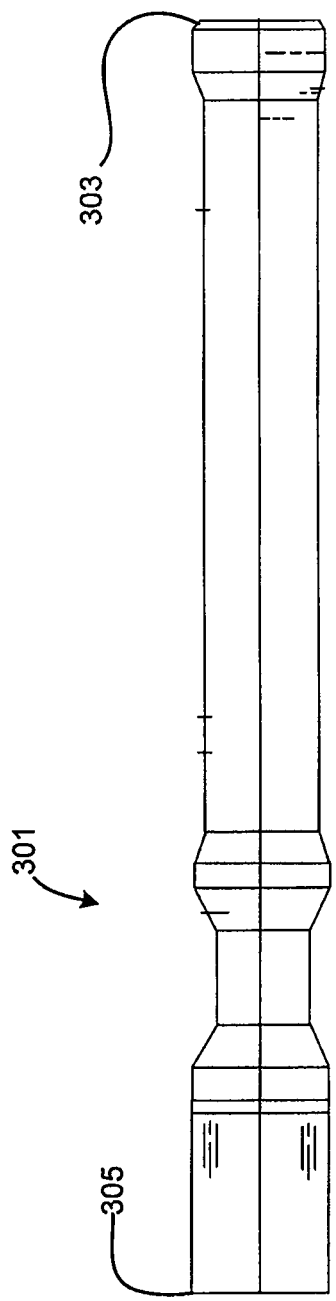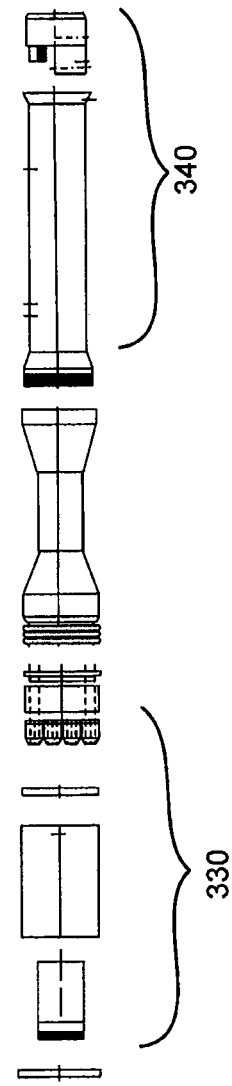
FIG. 4
FIG. 5

DUAL POLARIZING HOOD

RELATED APPLICATIONS

This application claims priority to and the benefit of U.S. Provisional Application Ser. No. 61/537,507, entitled "DUAL POLARIZING HOOD" filed Sep. 21, 2011, which is incorporated herein by reference.

FIELD OF THE INVENTION

The present invention relates to a polarizing lens hood for at least one of digital still or digital video cameras, and more specifically to a dual polarizing lens hood for at least one of digital still or digital video cameras that have a light source collocated with the camera lens objective.

BACKGROUND OF THE INVENTION

In general, light can be described as a transverse electromagnetic wave and thus its interaction with matter can depend on the orientation of the electric field vector. Such phenomena and interaction are called polarization effects. Various optical elements can change the polarization of a light beam. A polarizing filter may be used to select which light beams/rays are viewed by a lens. Linear Polarizing (PL) and Circular Polarizing (PL-CIR) filters may remove unwanted reflections from non-metallic surfaces such as water, glass, etc. In some cases, use of a polarizing filter may also enable colors to become more saturated and appear clearer, with better contrast.

Historically, a lens of a camera may be fitted with a single polarizer to filter the light from the sun. However, in certain situations it may be advantageous to provide a secondary light source to a lens and/or camera.

Accordingly, there exists a need for a polarizer and that polarizes its own light source and reflects the polarized light back through another polarizing lens into the receiving lens. There also exists a need for a removable hood when polarization is not desired. There also exists a need for the level of polarization to be adjustably controlled.

BRIEF SUMMARY OF THE INVENTION

The present disclosure recites a first polarizer coupled to a light source configured to reflect polarized light back through another polarizing lens into a receiving lens. The present disclosure also discloses detaching a removable polarizing hood when polarization is not desired. The present disclosure also discloses adjustably controlling the polarization level.

Advantages of the present invention will become more apparent to those skilled in the art from the following description of the embodiments of the disclosure which have been shown and described by way of illustration. As will be realized, the invention is capable of other and different embodiments, and its details are capable of modification in various respects. Accordingly, the drawing(s) and description are to be regarded as illustrative in nature and not as restrictive. Additionally, the measurements disclosed in the drawings are to be regarded as illustrative in nature and not as restrictive.

BRIEF DESCRIPTION OF SEVERAL VIEWS OF THE DRAWINGS

FIG. 1F is a bottom view of the dual polarizing hood of FIGS. 1A and 1B;

FIG. 1G is a side view of the dual polarizing hood of FIGS. 1A and 1B;

FIG. 1H is a top view of the dual polarizing hood of FIGS. 1A and 1B;

FIG. 4 is a side view illustrating a handheld video examination camera in accordance with one embodiment of the invention;

FIG. 5 is an exploded view further illustrating the handheld video examination camera of FIG. 4;

DETAILED DESCRIPTION

The following descriptions are of exemplary embodiments of the invention only, and are not intended to limit the scope, applicability, or configuration of the invention in any way. Rather, the following description is intended to provide convenient illustrations for implementing different embodiments of the invention. As will become apparent, various changes may be made in the function and arrangement of the elements described in these embodiments without departing from the spirit and scope of the invention. For example, various changes may be made in the design and arrangement of the elements described in the preferred embodiments without departing from the scope of the invention as set forth in the appended claims.

In general, the present invention provides a dual polarizing lens hood for at least one of digital still or digital video camera, and more specifically to a dual polarizing lens hood for a camera that has a light source collocated with the camera lens objective. For example, as described further herein and in accordance with various exemplary embodiments of the present invention, a system for polarizing light provided by a light source via a first polarizer and further polarizing reflected light by a second polarizer, such that the provided light and the reflected light are each directed through the polarizing portion of the first and second polarizers one time.

Figure 1A:
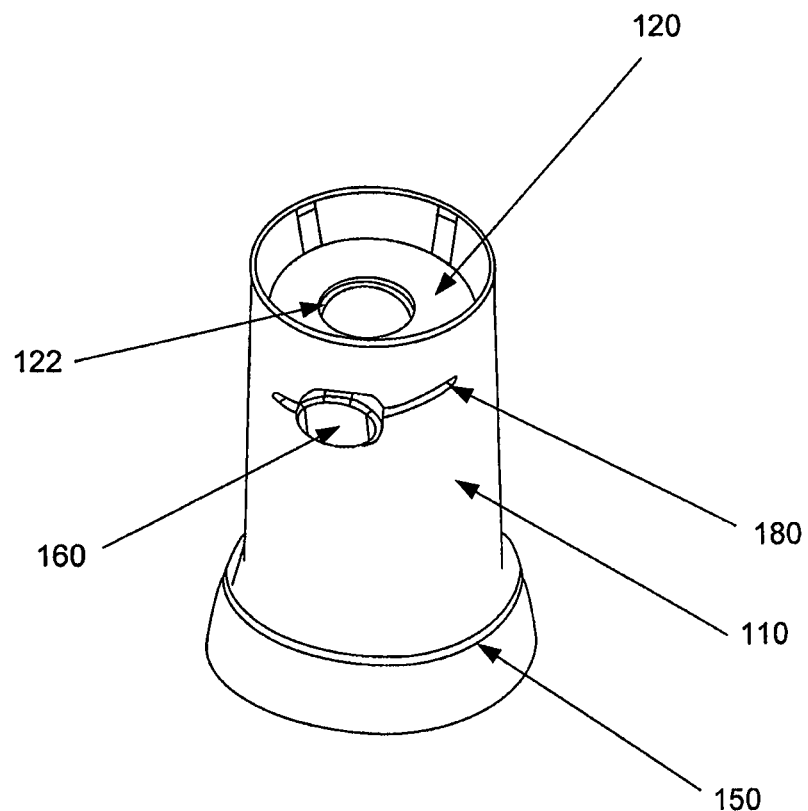
FIG. 1A is an isometric top view of an embodiment of a dual polarizing hood.
Figure 1B:
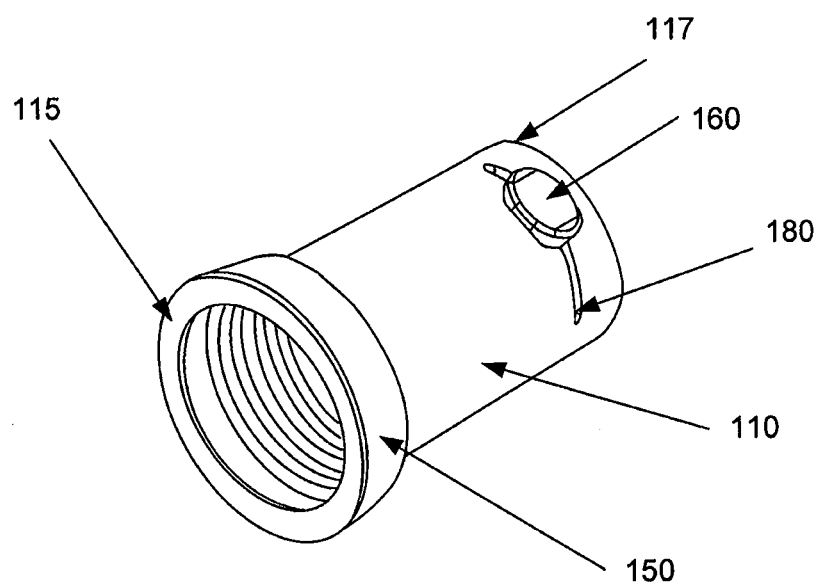
FIG. 1B is an isometric side view of the dual polarizing hood of FIG. 1A.

Referring to FIGS. 1A and 1B, an exemplary embodiment of a dual polarizing hood 100 is shown (top view and side view). In various embodiments, the dual polarizing hood 100 may comprise a hood body 110, a polarizing window 120, and a rotational window/polarizer 130. The polarizing hood may also comprise a derm hood 150, and a switch 160 for adjusting the polarization of the device.

Figure 1C:
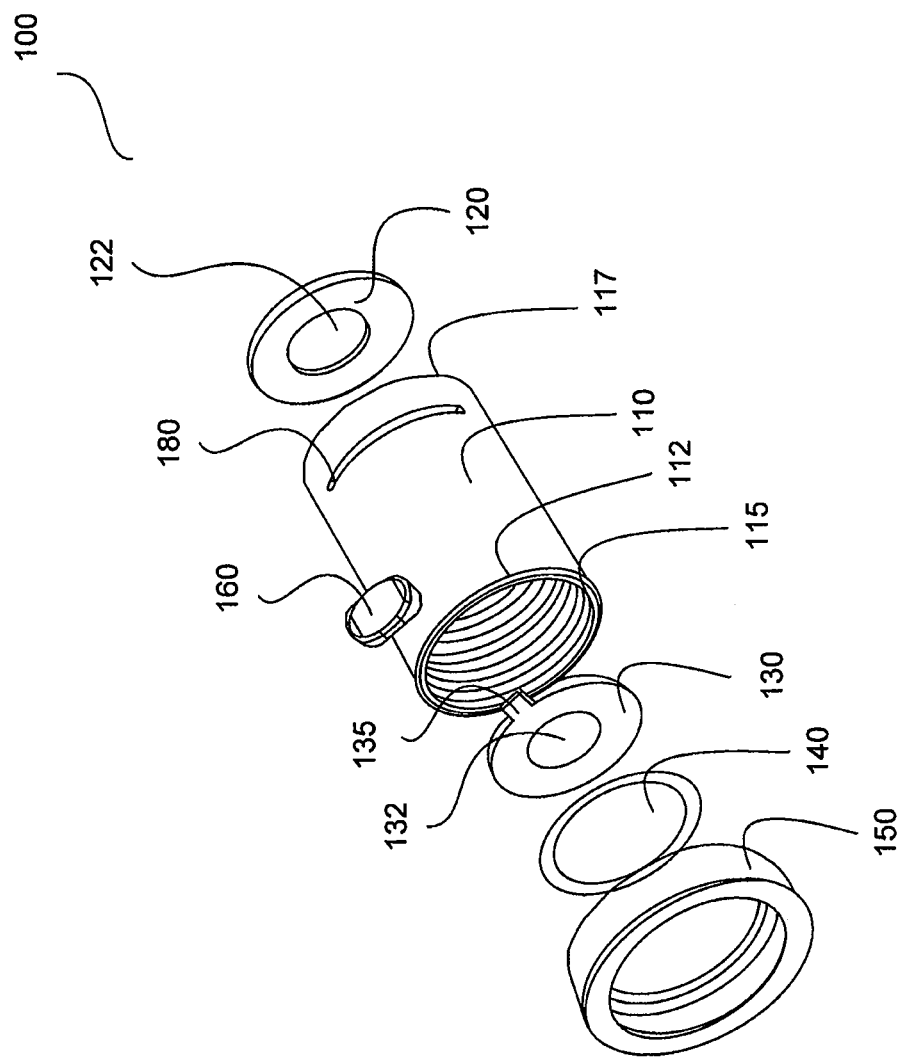
FIG. 1C is an exploded view of the dual polarizing hood of FIGS. 1A and 1B.
Figure 1D:
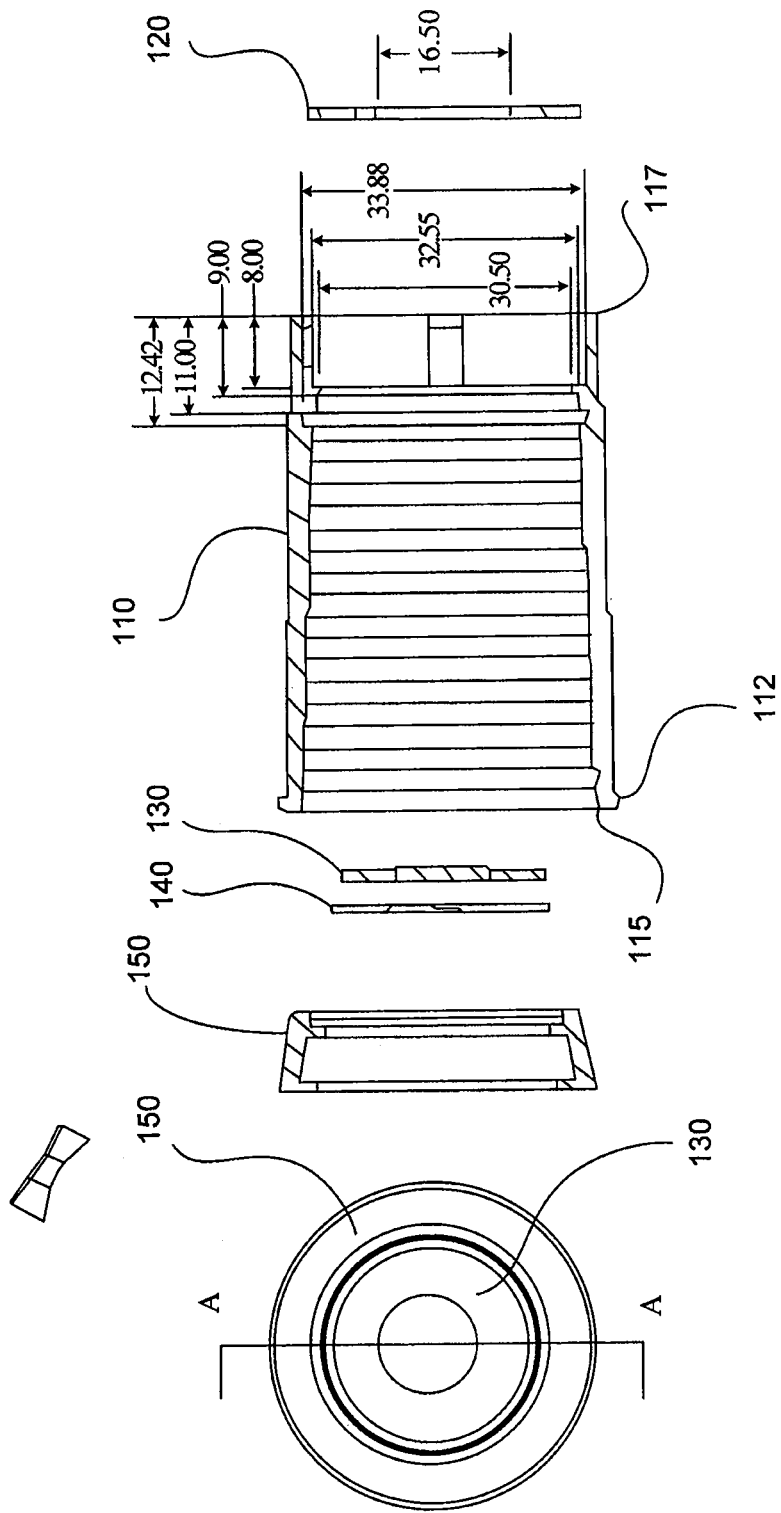
FIG. 1D (section A-A) is an exploded view of the dual polarizing hood of FIGS. 1A and 1B along cross section A.

In an exemplary embodiment, the hood body 110 is configured to provide structural support for the various polarizing hood 100 elements. Though it may be any suitable shape, in an embodiment, the exterior surface of hood body 110 is generally conical. Hood body 110 may be formed from a rigid material. In an embodiment, hood body is opaque. In various embodiments, at least a portion of hood body may be clear. The exterior diameter of hood body 110 is configured to gradually increases from the end of hood body 110 intended to be coupled to a lens 117, to the opposite end 115 of hood body 110. Hood body generally comprises an open internal cavity running from one end 117 of the polarizing hood to the other end 115. Similar to the exterior surface of hood body 110, and with reference to FIG. 1D, an exploded view of the polarizing hood of FIGS. 1A and 1B along cross section A-A, the interior cavity of hood body 110, gradually increases from the end 117 to the opposite end 115 of hood body 110.

End 117 of hood body 110 may comprise features for coupling polarizing hood 100 to another object. For instance, coupling polarizing hood 100 to a still and/or video digital camera, such as camera 301. These features for coupling may be threading, clips, grooves for receiving anchoring members, pressure fit, and the like. This coupling is intended to be suitably strong to retain the polarizing hood 100 to another object as desired and to allow for convenient decoupling of polarizing hood 100 from the object as desired, for instance, when polarization is not desired.

Hood body 110 may comprise surface features to aid in gripping the polarizing hood 100 and/or coupling and decoupling the polarizing hood 100 from a still and/or video digital camera device, such as camera 301. Hood body 110 may also comprise surface features to aid in retaining optional derm hood 150. For instance, hood body 110 may comprise a raised lip 112 around at least a portion of end 115 which derm hood 150 may be press fit over. For instance, and with reference to exploded view of polarizing hood 100 FIGS. 1C and 1D, the raised lip 112 can be seen juxtaposed end 115. Optionally, in various embodiments a clear lens may be coupled to end 115 to prevent debris and other unwanted particles from entering end 115.

In an embodiment, though it may be made from any suitable material, derm hood 150 may be made from a polymer, such as a medical grade polymer. Derm hood 150 may be any suitable shape; such as conical, elliptic cylinder, parabolic cylinder, hyperbolic cylinder or cylindrical. In an embodiment, with renewed reference to FIGS. 1A-1G, derm hood 150 is substantially cylindrical with an open interior. The interior dimension of derm hood 150 may substantially mirror the exterior surface dimensions of the end 115 of hood body 110. As shown, derm hood 150 may be coupled to hood body 110 by elastically stretching derm hood 150 over raised lip 112. In some embodiments, derm hood 150 is configured for one time use to promote sanitary and sterile objectives. In this manner, derm hood 150 may be in contact with a surface such as the skin of a patient and replaced with a second derm hood 150 prior to contacting a second surface, such as the skin of a second patient. Derm hood 150 may cover end 115 of hood body 110 or it may cover the majority of the external surface of hood body 110 (not shown).

Hood body 110 may comprise surface features to aid in positioning polarizing hood 100. For instance, hood body 110 may be marked with one or more surface markings, such as an arrow or line to indicate 0 axis position, to aim hood body 110 and an associated camera.

Figure 1E:
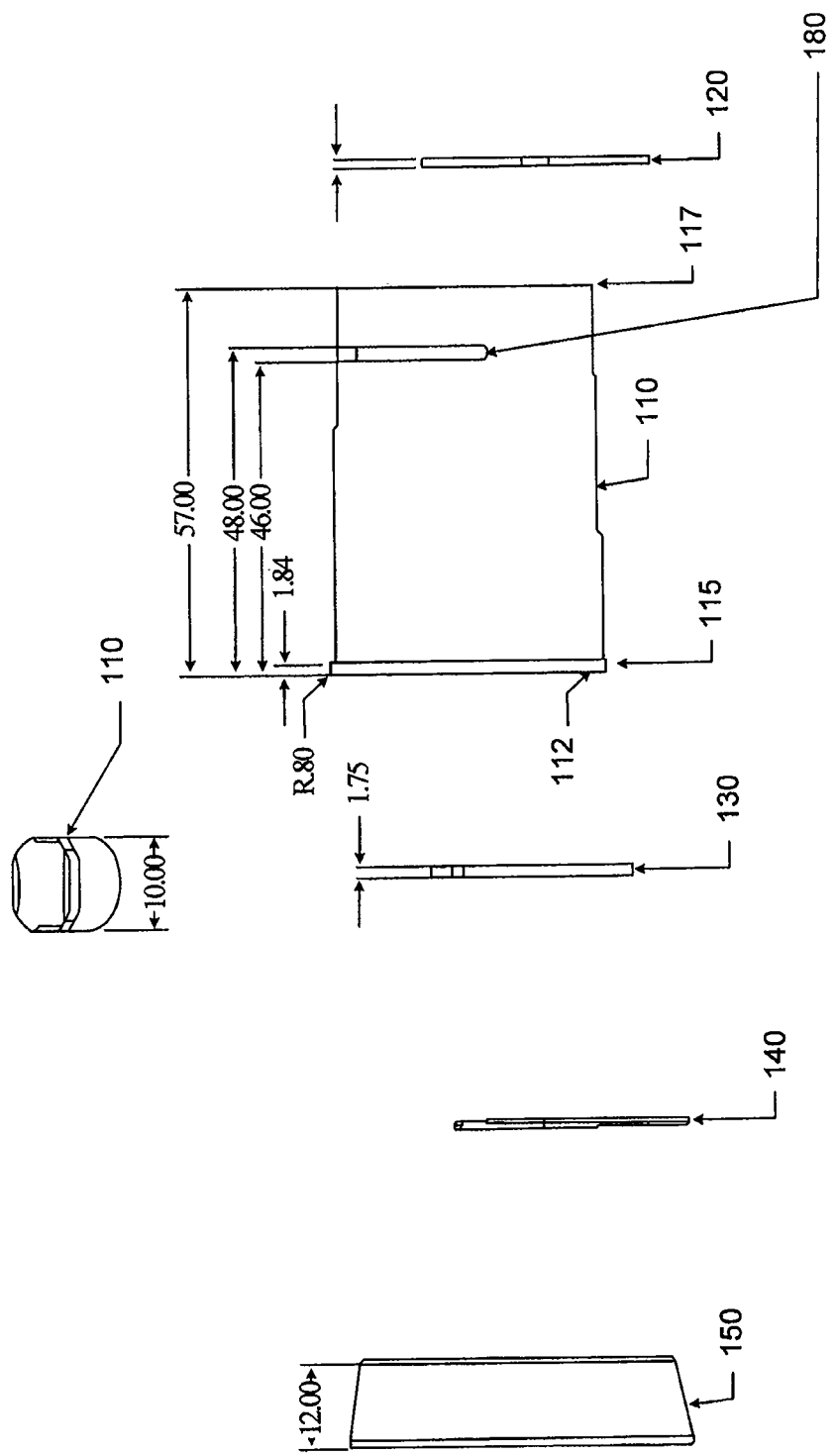
FIG. 1E is a side exploded view of the dual polarizing hood of FIGS. 1A and 1B.

In an embodiment and with reference to FIG. 1E, hood body 110 may comprise a slot opening 180 for a portion of rotational window/polarizer 130 to pass through (described in greater detail below).

Hood body 110 may also comprise surface features to aid positioning rotational window/polarizer 130. For instance, hood body 110 may be marked with one or more surface markings adjacent to and/or near slot opening 180, such that a user may be able to select and note a preferred polarization setting. For instance, dashes at regular intervals with associated characters, such as numbers, to indicate degrees from the 0 axis position. Polarizing window 120 may comprise a polarizing filter. For instance, the polarizing filter may be a linear polarizing filter, circular polarizing filter, or reflecting polarizing filter. The linear polarizing filter may be dichroic. In its broadest sense the term dichroism may refer to the selective absorption of one of the two orthogonal components of an incident beam of light. The polarizing filter may be impregnated with a compound which makes the molecules conductive so they absorb light whose electric field is parallel to the molecular chains. The resultant polarizing filter blocks waves with electric fields along the molecular axes, and passes waves with perpendicular electric fields. The output is a beam which is linearly polarized along the preferred axis.

Metering and auto-focus sensors in certain cameras, including virtually all auto-focus single lens reflect cameras, may not work properly with a linear polarizer because the beam splitters used to split off the light for focusing and metering are polarization-dependent. A circular polarizer may include a linear polarizer on the front, which selects one polarization of light while rejecting another, followed by a quarter wave plate, which converts the selected polarization to circularly polarized light inside the camera, which works with most all types of cameras, because mirrors and beam-splitters split circularly polarized light the same way they split unpolarized light.

Polarizing window 120 may be configured to have a substantially circular cross section sized to securably fit inside the interior of hood body 110. In an embodiment, polarizing window 120 is positioned with the center of its face perpendicular to the axis running through hood body 110 facing end 117. The polarizing filter of polarizing window 120 may be oriented in any suitable orientation, such as with the 0 axis of the polarizing filter directed to the top of hood body 110 (e.g., twelve o'clock). Alternatively, polarizing window 120 may be oriented to optimally interact with known/or measured properties of the provided light source.

The polarizing filter selected may be optimized based on the type of light source. For instance, a polarizing filter for white light (about 560 nm) may not be as efficient as for other light sources such as blue (480 nm), green (560 nm), and/or red (660 nm). The polarizing filter may comprise a multi-resistance coating, to help prevent scratches and repel dirt and water. This coating may also reduce flare and ghosting at the filter surface. The polarizing filter may be a neutral polarization filter with weather and/or dust sealing.

In an embodiment, polarizing window 120 comprises a polarizing portion and a non-polarizing portion. For instance, polarizing window 120 may comprise an opening 122 towards the center of polarizing window 120 to allow reflected light to reach the lens without passing through the polarizing filter of polarizing window 120. Opening 122 may be a circular opening. For instance, the polarizing filter of polarizing window 120 may be oriented around at least a portion of the perimeter of polarizing window 120. In another embodiment, polarizing window 120 may comprise a clear non-polarizing lens 122 towards the center of polarizing window 120 to allow reflected light from end 115 to a provided lens without passing through a polarizing filter of polarizing window 120.

In an embodiment, the polarizing filter of polarizing window 120 may be fitted in hood body 110 such that the polarizing filter portion of polarizing window 120 polarizes light emitted from a light source collocated with a lens, such as an embedded light, and does not polarize light reflected from end 115 to the lens.

Rotational window/polarizer 130 may comprise a polarizing filter. For instance, the polarizing filter may be a linear polarizing filter, circular polarizing filter, or reflecting polarizing filter. Rotational window/polarizer 130 may be configured to have a substantially circular cross section. In an embodiment, rotational window/polarizer 130 is positioned with the center of its face perpendicular to the axis running through hood body 110 facing end 115.

In an embodiment, rotational window/polarizer 130 comprises a polarizing portion and a non-polarizing portion. For instance, rotational window/polarizer 130 may comprise a clear lens (e.g., the non-polarizing portion) towards perimeter of rotational window/polarizer 130 to allow light from a light source collocated with a lens, such as an embedded light, to reach end 115 without passing through the polarizing filter of rotational window/polarizer 130. Rotational window/polarizer 130 may also comprise a small polarizing filter located towards the center of rotational window/polarizer 130 configured to filter reflected light entering end 115.

Rotational window/polarizer 130 may comprise an extension arm 135 configured to extend radially through slot opening 180. Switch 160 may be coupled to a distal portion of extension arm 135 extending through slot opening 180. Rotational window/polarizer 130 may be manually rotated about the center axis of hood body 110. Stated another way, in an embodiment, rotational window/polarizer 130 may be rotated with respect to the objective of a lens. This rotation may allow a user to select a preferable level of polarization. Switch 160 may comprise a surface feature such as a tab or marking which when used with the surface markings adjacent to and/or near slot opening 180 on hood body 110 to align rotational window/polarizer 130 in a preferable orientation. The intensity of the reflected light may be adjusted by rotating rotational window/polarizer 130. Though window and polarizer 130 is depicted as being manually adjusted, it should be appreciated that rotational window/polarizer 130 may be mechanically and/or automatically rotated in response to electrical control signaling from a controller. It should also be appreciated, that in accordance with Brewster's law, at a certain orientation of rotational window/polarizer 130, all light may be absorbed by polarizing filter 132.

In an embodiment, the polarizing portion of polarizing window 120 substantially overlaps the non-polarizing portion of rotational window/polarizer 130, and the non-polarizing portion of polarizing window 120 substantially overlaps the polarizing portion of rotational window/polarizer 130 relative to light passing parallel through the center axis of hood body 110.

Internal retaining ring 140 may be coupled to hood body 110. Internal retaining ring 140 may be configured to retain rotational window/polarizer 130 in position. For instance, polarizing window 120 may be permanently or semi-permanently coupled in place within hood body 110 using an epoxy, glue, press fit or other suitable securing mechanism. Similarly, internal retaining ring 140 may be coupled in place within hood body 110 using an epoxy, glue, press fit or other suitable securing mechanism. In an embodiment, rotational window/polarizer 130 may be sandwichably positioned between internal retaining ring 140 and polarizing window 120 such that rotational window/polarizer 130 may be rotated about the central axis of hood body 110 (as allowed by the movement of extension arm 135 in slot 180). A lubricant may be added to the edge of rotational window/polarizer 130 to aid in rotation. It should be appreciated that though rotational window/polarizer 130 is depicted as being closest to end 117 with respect to polarizing window 120, the polarizing hood would operate as intended if polarizing window 120 was located closest to end 117 with respect to rotational window/polarizer 130.

FIGS. 1F-1H are bottom, side and top views (respectively) of the polarizing hood 100.

FIG. 1G is a side view of the dual polarizing hood of FIGS. 1A and 1B.

FIG. 1H is a top view of the dual polarizing hood of FIGS. 1A and 1B.

Figure 2:
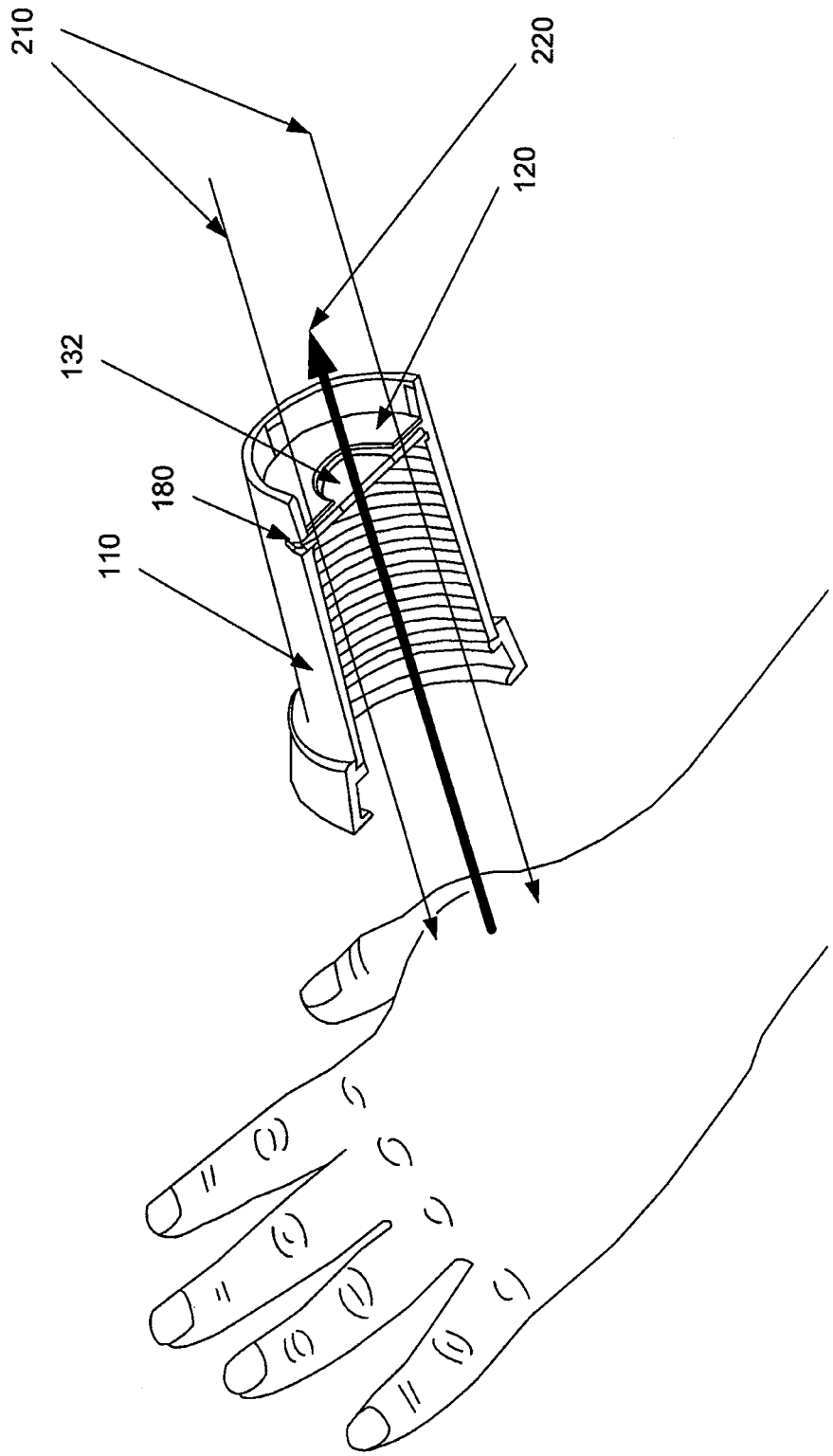
FIG. 2 depicts a side cutaway view of the operation of an dual polarizing hood.

With reference to FIG. 2, the polarizing hood 100 is directed towards an object of interest, (in this case, a hand). Light 210 from a light source embedded with a lens, such as on the same plane as a lens or near a lens is configured to be directed into end 117. The light 210 is directed through the polarizing filter portion of polarizing window 120. This polarizing/filtering of the provided light source creates controlled beams/rays of light to illuminate a target object. Using polarized light, the details of a specimen and/or object being illuminated, including its color, composition and structure which are normally invisible or difficult to discern using non-polarized light may be apparent. The polarized light is directed through the non-polarizing portion of rotational window/polarizer 130 (e.g., clear lens). The polarized light exits end 115. The polarized light illuminates the object of interest. Depending on the subject matter desired to be illuminated and the distance the subject is from end 115, additional grades of polarizer may be implemented in polarizing hood 100. For instance, various grades of polarizer may be implemented to pass different amounts of polarization.

The light is configured to be at least partially reflected from the object of interest through end 115 towards end 117. The reflected light 220 is directed through the polarizing filter portion 132 of rotational window/polarizer 130. The polarized reflected light 220 is directed through the non-polarizing portion of polarizing window 120 (e.g. opening 122). The polarized reflected light passes through end 115. The polarized reflected light is captured by a provided lens. Optionally, a user may adjust the desired polarization level of the reflected light by rotating rotational window/polarizer 130 a desired amount by manipulating switch 160. In various embodiments, rotational window/polarizer 130 may be locked in a preferred orientation using switch 160. In various embodiments, switch 160 has a first position and a second position. While switch 160 is in a first position, rotational window/polarizer may rotate with freedom. In response to switch 160 being in the second position a force is place on the exterior of hood 110 and rotational window/polarizer 130 may be locked in a preferred orientation, until switch put back into the first position.

Polarizing hood 100 may be suitably combined with aspects of a camera as disclosed in patent application Ser. No. 12/319,049, titled "System and Method for video Medical Examination and real time Transmission to remote Locations" filed Dec. 31, 2008. For instance, with reference to FIGS. 3 to 11 describe an exemplary embodiment of a video camera 301 that can be utilized in conjunction with Polarizing hood 100. The camera 301 may be a small, handheld, high-resolution examination camera. This camera may be used in the medical and life science fields. Polarization in spectral topography can vastly improve histopathological studies. Camera 301 is durable, light-weight, easy-to-use, includes a snap-shot capability and is freeze-frame ready. Camera 301 can interface directly into any number of analog or digital video processing devices as needed.

Figure 3:
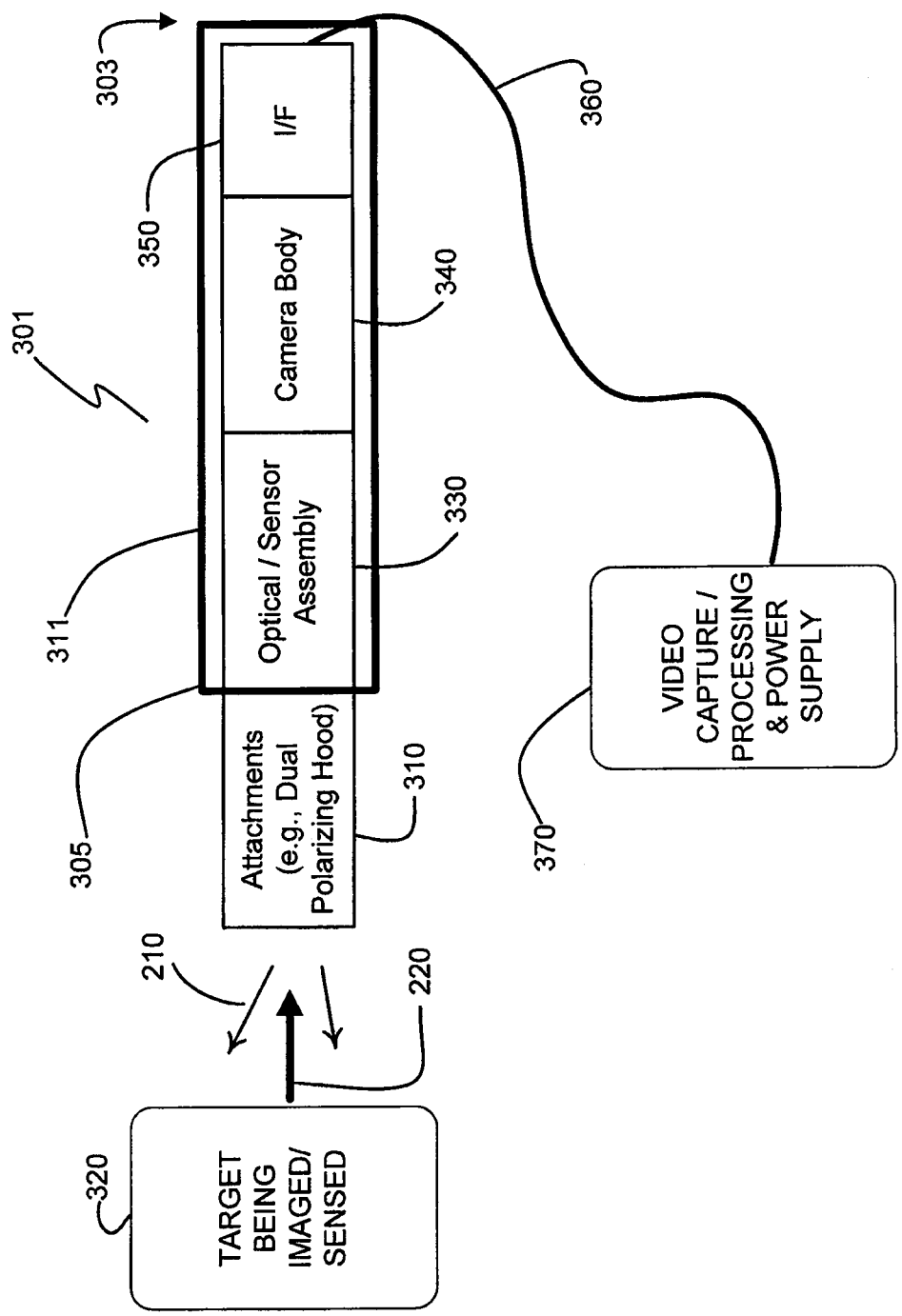
FIG. 3 is a block diagram illustrating a multisensory device imaging a target and interfacing with a video capture component.

The block diagram 100 of FIG. 3 includes an examination video camera 301 having an optical end 305 and an interface end 303 comprising an optical sensor assembly 330 in electrical communication with a camera body 340. Camera body 340 interfaces 350 a connection 360 which can be wired, optical, or wireless. Connection 360 provides data communication and, optionally, power to and from camera 301. Optical/sensor assembly 330 includes a light producing assembly 500 (FIG. 9) which provides illumination 210. Assembly 500 may be axially aligned with a lens assembly and is positioned so as not to illuminate the lens assembly other than via light 220 reflected off target 320 and up through the lens assembly into camera 301. The lens assembly may include a lens fixedly mounted inside a hollow lens barrel.

Light 220 reflected from a target 320 is received and processed by optical/sensor assembly 330, is relayed to the camera body 340, and is transmitted to a video capture and/or processing component 370. Optional attachments 310 can be mounted on the optical end of the camera body 140, and may include for example polarizing hood 100.

Figure 6:
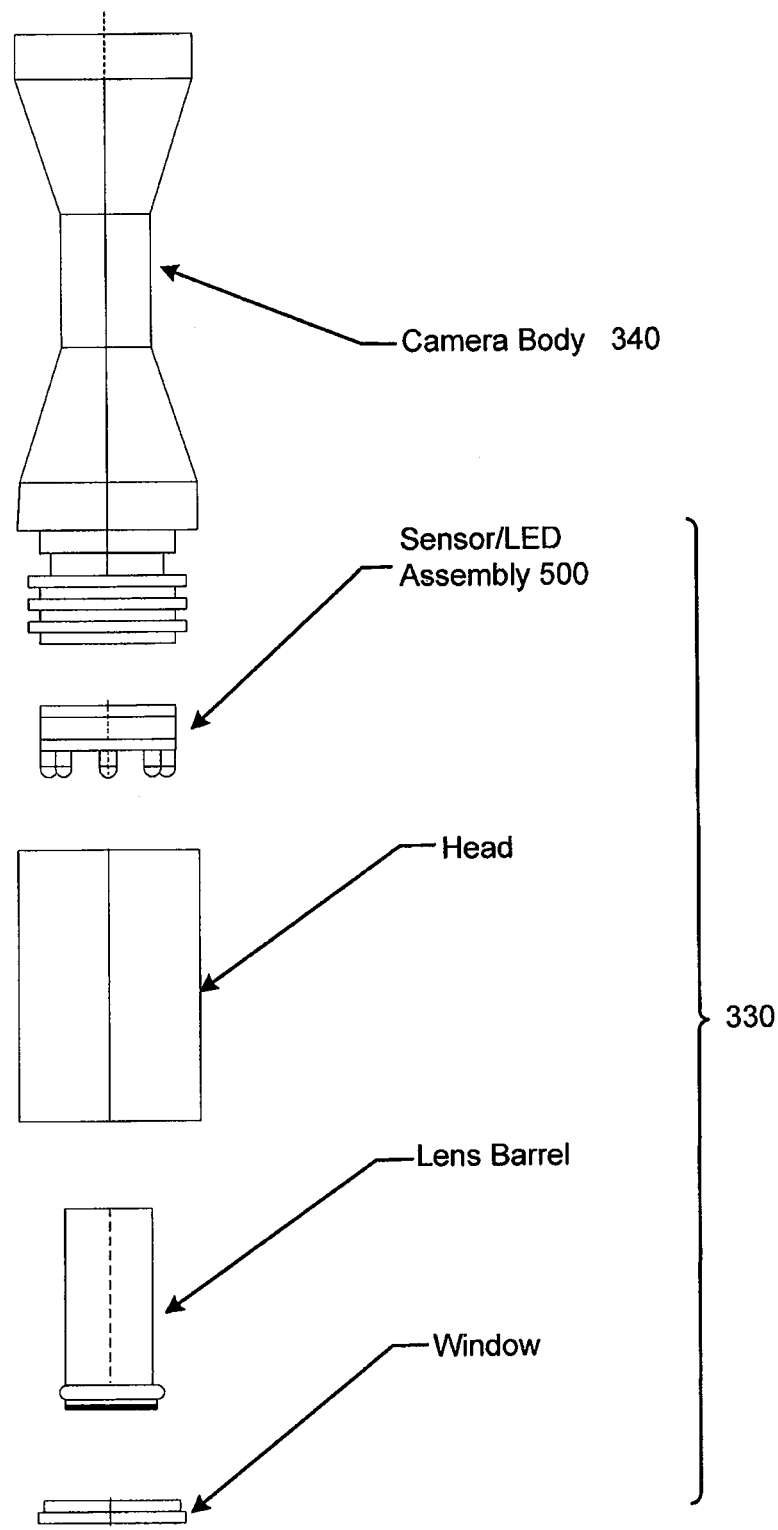
FIG. 6 is an exploded view further illustrating a portion of the camera of FIG. 4.
Figure 7:
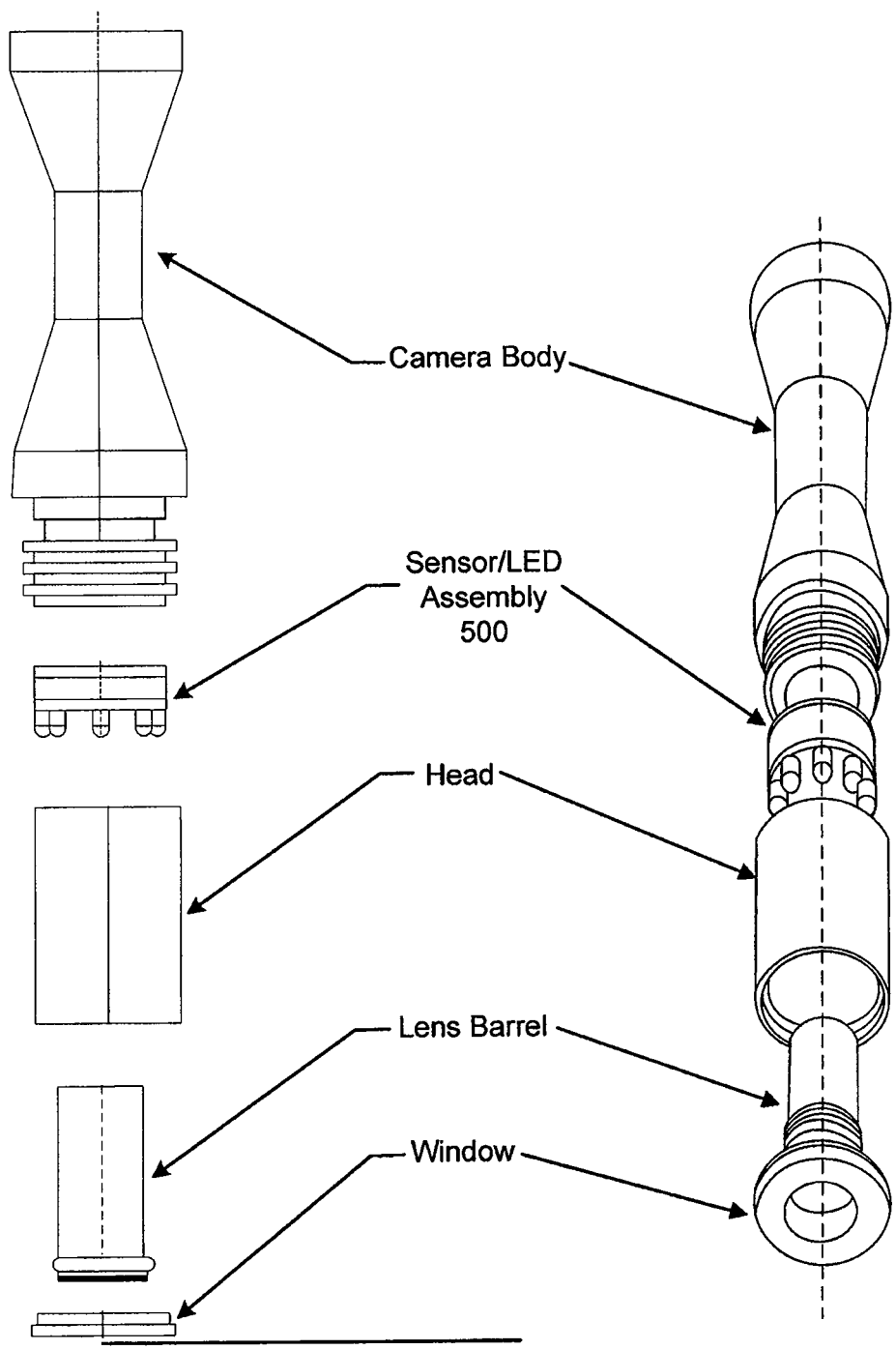
FIG. 7 further illustrates a portion of the handheld video examination camera of FIG. 4.
Figure 8:
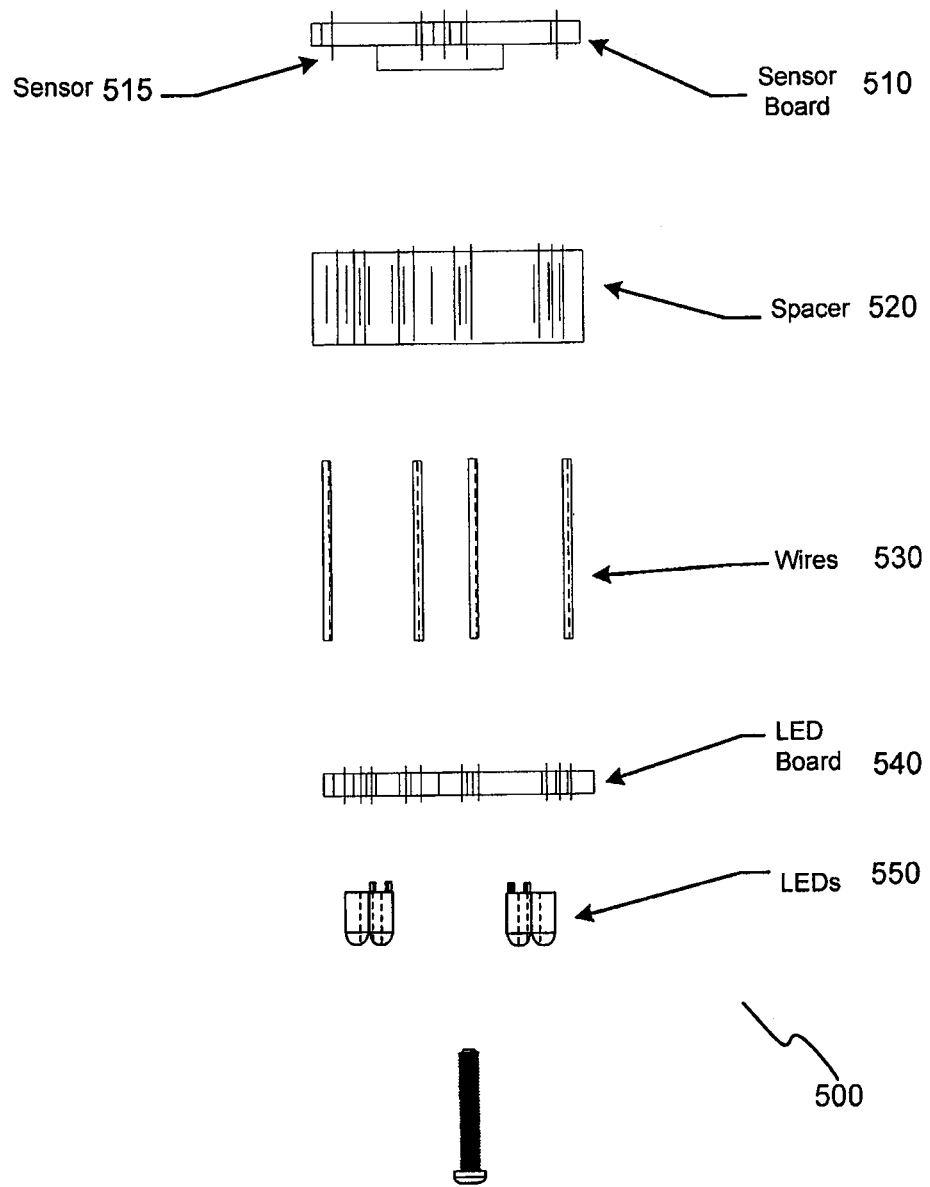
FIG. 8 is a side exploded view of a light-sensor construction in the camera of FIG. 5.
Figure 9:
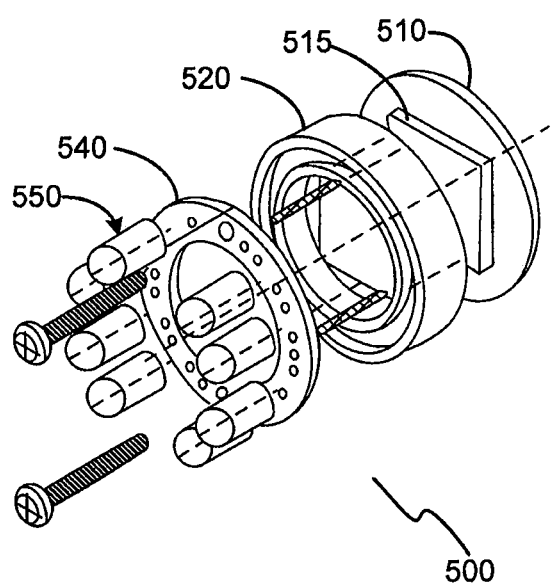
FIG. 9 is a perspective view further illustrating the light-sensor construction of FIG. 8.
Figure 10:
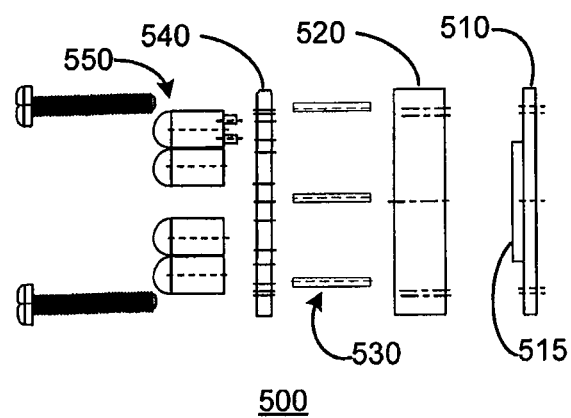
FIG. 10 is a side view further illustrating the light-sensor construction of FIG. 8.
Figure 11:
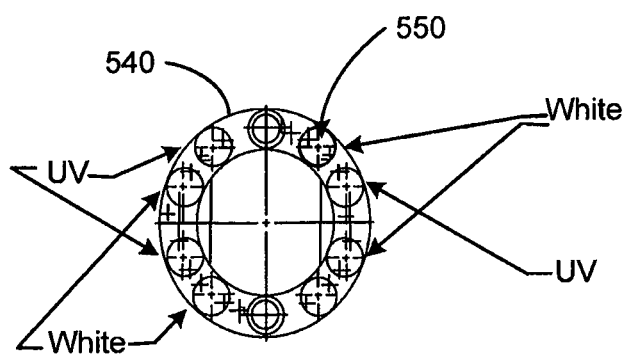
FIG. 11 is a bottom view further illustrating the light assembly of FIG. 8.

An external view of camera 301 is shown in FIG. 4. FIG. 5 is a partial exploded view of the handheld video examination camera 301, an optical/sensor assembly 330, camera body 340 and housing. In FIGS. 6 and 7, the optical sensor assembly 330 is shown in further detail and includes sensor/LED assembly 500, a head, a lens barrel, and a window. In FIGS. 8 and 9, LEDs 550 are mounted on LED board 540 and wires 530 each deliver electricity to an LED 550. When assembled, LED board 540 is secured adjacent spacer 520, and spacer 520 is secured adjacent sensor board 510. Sensor 515 is mounted on board 510.

LEDs 550 or another desired light source can produce visible or non-visible light having any desired wavelength, including, for example, visible colors, ultraviolet light, or infrared light. The light source can produce different wavelengths of light and permit each different wavelength to be used standing alone or in combination with one or more other wavelengths of light. The light source can permit the brightness of the light produced to be adjusted. For example, the light source can comprise 395 nM (UV), 860 nM (NIR), and white LEDs and can operated at several brightness levels such that a health care provider can switch from white light to a "woods" lamp environment at the touch of a control button on the camera 301. The light source, or desired portions thereof, can be turned on and off while camera 301 is utilized to examine a target. In some instances, it may be desirable to depend on the ambient light and to not produce light using a light source mounted in camera 301. In which case reflected light 220 comprises ambient light and/or light from other than the light source collocated with the lens.

While preferred embodiments of the present invention have been described, it should be understood that the present invention is not so limited and modifications may be made without departing from the present invention. The scope of the present invention is defined by the appended claims, and all devices, process, and methods that come within the meaning of the claims, either literally or by equivalence, are intended to be embraced therein.

The invention claimed is:

1. A polarizing device for polarizing light captured by a lens comprising a conduit having a first open end and a second open end; wherein the first open end is coupled to a light source, wherein the first open end is configured to be coupled to the lens;

a first polarizing filter positioned within the conduit for receiving light from the light source; and a second polarizing filter positioned within the conduit for receiving reflected light from the light source, the reflected light received through the second open end, wherein a derm hood is removably coupled to the conduit and configured to protect a distal end of the tube from contact with foreign bodies.

2. The device of claim 1, wherein the first polarizing filter is configured to allow reflected light from the light source to pass through a portion of the first polarizing filter without being filtered.

3. The device of claim 1, wherein the first polarizing filter comprises a polarizing portion and a non-polarizing portion.

4. The device of claim 3, wherein the polarizing portion is located along the perimeter of the first polarizing filter and a non-polarizing portion is located in the center of the first polarizing filter.

5. The device of claim 1, wherein the second polarizing filter comprises a polarizing portion and a non-polarizing portion.

6. The device of claim 5, wherein the polarizing portion is located in the center of the second polarizing filter and the non-polarizing portion is located along the perimeter of the first polarizing filter.

7. The device of claim 1, wherein the first polarizing filter and the second polarizing filter are linear polarizing filters.

8. The device of claim 1, wherein the light source is collocated with the lens.

9. The device of claim 1, wherein the second polarizing filter is rotatably adjustable relative to the first polarizing filter to alter the polarity of the received reflected light.

10. The device of claim 1, wherein the lens is at least one of a digital still camera lens and a digital video camera lens.

11. The device of claim 10, wherein the polarizing device is configured to be conveniently uncoupled from the camera when its use is not desired.

12. The device of claim 1, wherein the conduit is axially aligned with the lens and is positioned so as not to illuminate the lens other than via light reflected off a target and up through the lens.

13. A hooded polarizing tube configured to be coupled to a camera having an embedded light at least partially surrounding a camera lens comprising:

an opening to securably couple the tube to the camera;

a first polarizing filter positioned in the tube fitted over the embedded light; wherein a polarizing region of the first polarizing filter does not overlap reflected light captured by the camera lens; and a smaller second polarizing filter positioned in the tube configured to filter the reflected light coming back to the lens, wherein the first polarizing filter is located between the second polarizing filter and the camera lens, wherein a derm hood is removably coupled to the conduit to protect a distal end of the tube from contact with foreign bodies.

14. The hooded polarizing tube of claim 13, wherein the first polarizing filter and the second polarizing filter are linear polarizing filters.

15. The hooded polarizing tube of claim 13, wherein the second polarizing filter is rotatably adjustable relative to the first polarizing filter to alter the polarity of the received reflected light.

16. The hooded polarizing tube of claim 13, wherein the hooded polarizing tube is configured to be conveniently uncoupled from the camera when its use is not desired.

17. The hooded polarizing tube of claim 13, wherein the tube is axially aligned with the camera lens and is positioned so as not to illuminate the camera lens other than via light reflected off a target and up through the camera lens.

\* \* \* \* \*